Feb. 16, 1971  B. FRANCOIS ET AL  3,564,081
PROCESS FOR PREPARATION OF CERAMICS OF FISSIONABLE MATERIALS
Filed March 7, 1968

INVENTORS
BERNARD FRANCOIS
ROGER GREMERET

BY *William A. Stoker*

ATTORNEY

United States Patent Office 3,564,081
Patented Feb. 16, 1971

3,564,081
PROCESS FOR PREPARATION OF CERAMICS OF FISSIONABLE MATERIALS
Bernard François, Grenoble, and Roger Gremeret, Saint-Egreve, France, assignors to Commissariat a l'Energie Atomique, Paris, France, a French organization
Filed Mar. 7, 1968, Ser. No. 716,258
Claims priority, application France, Mar. 9, 1967, 98,181
Int. Cl. G21c *21/00, 21/02, 21/04*
U.S. Cl. 264—.5             11 Claims

ABSTRACT OF THE DISCLOSURE

Starting from a powder, especially a powder of uranium oxide, a first compression at a pressure P is carried out so as to obtain granules of desired size. Then, after crushing these granules and sifting, a second compression at a pressure $p$ lower than P is carried out. Finally, sintering is carried out, for example between 1300° C. and 1700° C. This leads to porous ceramics having open porosity, which porosity appears to be higher as the difference $P-p$ is greater.

---

The present invention relates to processes for the preparation of ceramics from powders, and more particularly from powders of oxides of fissionable materials, especially uranium, plutonium or thorium, these compounds being taken alone or in a mixture.

The chief object of this invention is to permit ceramics to be obtained having open porosity.

According to the principal feature of the invention, starting from a powder, especially from a powder of uranium oxide, a first compression at a pressure P is carried out, so as to obtain granules of desired size, then, after crushing these granules and sifting, a second compression at a pressure $p$ lower than P is carried out, and finally sintering is carried out, for example between 1300° C. and 1700° C., this practice leading to the obtainment of porous ceramics having open porosity, which porosity appears to be higher as the difference $P-p$ is greater.

Apart from this principal feature, the invention comprises certain other features which are preferably used at the same time and which will be more specifically described hereafter.

The invention is particularly applicable to fissionable materials, in particular to uranium oxide $UO_2$.

Figure 1:
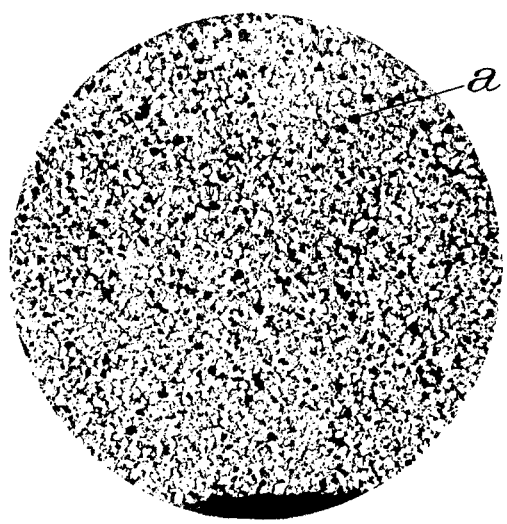
Figure 2:
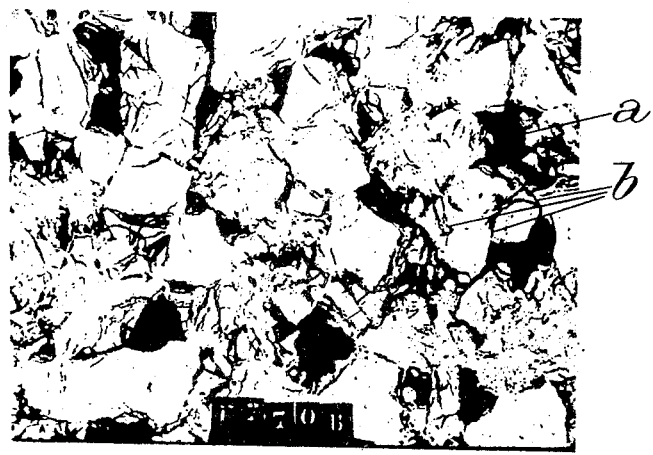

The invention will be easily understood from the following particular description, given merely by way of example, with reference to the accompanying drawings, in which:

FIGS. 1 and 2 are micrographs, respectively at two different magnifications (10 and 100) of a ceramic of $UO_2$ obtained by the process according to the invention.

The following specific description will be given with particular reference to ceramics of a fissionable material, whose base is uranium, more particularly uranium oxide, although other metals such as plutonium, thorium, etc. can be envisaged.

It is appropriate to mention at the present time that it is desirable, in numerous applications, to be able to have at one's disposition, by compression of a powder and sintering, a material or a ceramic having a certain porosity and in particular an open porosity.

Such a ceramic can present certain advantages for its use in a nuclear reactor, such as better stability in the course of irradiation at very high combustion rates. Moreover, such a ceramic permits a "cermet" to be made by impregnation by a metal having a better thermal conductivity.

Now it was found that a simple process for obtaining such porous ceramics—this process being specific to the present invention—comprised carrying out two successive compressions, namely a first compression at a pressure P, then a second compression at a pressure $p$ lower than P; experience has shown, as will be seen from the table appearing later on, that the greater the difference $P-p$ is, the higher is the proportion of pores having open porosity, that is to say the higher is the proportion of pores between agglomerates.

A few embodiments will now be given by way of example, in the case of the oxide $UO_2$.

The process thus comprises two types of compression, the first of which comprises the preparation of small blocks of $UO_2$ compressed, by cold compression, in a press, of a powder of $UO_2$ having a high specific area.

Still by way of example: the specific area in particular comprised between 3 and 15 square meters per gram, whereas the pressure P is of the order of 5 to 9 metric tons per square centimeter.

After the compression, the blocks are subjected to crushing in view of the second stage, this crushing being able to be carried out dry, and being followed by sifting to permit the selection of a certain granulometric fraction, in particular of the order of 50 to 400 microns, preferably from 160 to 250 microns. A spheroidization can be provided in addition, by any known processes.

Turning now to the second stage, it comprises a new cold compression at a pressure $p$ which is chosen for example of the order of 2 to 5 metric tons, as a function of course of the value chosen for P and as a function of the use intended for the final product; this second compression is carried out in any appropriate mould.

Finally, a third stage comprises the sintering of the compacts thus obtained, this sintering generally taking place in a reducing atmosphere (in hydrogen for example) at temperatures which can vary for example between 1300° C. and 1700° C. For the choice of this temperature, it is noted that the higher this temperature is, the more the density of the final product has a tendency to approach the theoretical density, so that the remaining difference, which corresponds to the sum of the open porosity (porosity between agglomerates) and the closed porosity (porosity in the agglomerates) tends to decrease to the detriment of these two porosities.

Moreover, the duration of the sintering also plays a part; analogous results can be obtained by a long treatment duration at a lower temperature (20 hours at 1400° C. for example) and by a shorter duration at a higher temperature (1 hour for example at 1600° C.). The initial increase of the temperature is for example carried out at a rate of 300° C. per hour.

In addition, it is appropriate to add that, in a general manner and in view of the obtainment of the purpose intended (ceramics having open porosity):

(a) On the one hand, the difference between the two pressures, $P-p$, is greater than 1 metric ton, (b) On the other hand, it is noted that the higher the specific area is, the smaller this difference $P-p$ can be, without however descending below 1 metric ton.

In order to bring out clearly the influences of the various factors which come into play and to enable the man in the art to choose the values preferred in view of the purpose to be attained, a table is given herebelow showing the various porosities adapted to be obtained, from the same initial product.

| Example | A<br>1st pressure P in metric tons/cm.² | B<br>2nd pressure p in metric tons/cm.² | C<br>Density of the compacts | D<br>Sintering in H₂ increase 300° C./h. | E<br>Sintered density | F<br>Percent of the theoretical density | G<br>Open porosity, percent of the volume |
|---|---|---|---|---|---|---|---|
| 1a | 5 | 2 | 5.22 | 20 hours at 1,400° C | 9.54 | 87 | 10.8 |
| 1b |   |   |   | 5 hours at 1,450° C | 9.68 | 88.3 | 8.9 |
| 2 | 7 | 2 | 5.39 | 20 hours at 1,400° C | 9.38 | 85.5 | 12 |
| 3a | 7 | 3 | 5.60 | 20 hours at 1,400° C | 9.73 | 88.7 | 9.1 |
| 3b |   |   |   | 1 hour at 1,600° C | 9.77 | 89.1 | 8.8 |
| 4a | 5 | 4 | 5.70 | 20 hours at 1,400° C | 10.10 | 92 | 5.3 |
| 4b |   |   |   | 1 hour at 1,600° C | 10.24 | 93.4 | 3.9 |
| 5a | 7 | 5 | 6.0 | 20 hours at 1,400° C | 10.13 | 92.5 | 5.5 |
| 5b |   |   |   | 1 hour at 1,600° C | 10.20 | 93 | 5 |

In columns C and E of this table the densities of the compacts have been indicated before and after sintering. The open porosity, measured by any appropriate method, is indicated in column G. Furthermore, knowing the theoretical density of $UO_2$, that is to say 10.97, one can obtain, by calculating in percentage the difference between this theoretical density and the value indicated in column E, the value of the total porosity, that is to say the sum of the open porosity (intervals between agglomerates) and the closed porosity (intergranular pores). For example, in the first line, this difference is:

$$10.97 - 9.54 = 1.43$$

which gives in percentage 13%, namely the value of the total porosity. From the difference with respect to the open porosity, it is seen that the closed porosity is 2.2%.

In a general manner, it can be seen by reading the table: that the closed porosity remains of the order of 2 to 3%, and that the open porosity varies between 4% and 12%, being higher as the difference between P and $p$ is greater. Values of 15% and even 20% can be attained.

The man in the art will thus be able, by making use of this law, to obtain the values desired for the open porosity.

By way of example, the micrograph of a sample corresponding to Example 3(a) has been shown in the figures. This micrograph shows clearly the intervals $a$ of open porosity, and the small pores $b$ in the agglomerates. The apparent density is approximately 89% of the theoretical density with an open porosity of about 9% by volume. It seems rather easy to improve considerably further the homogeneity of the size and of the distribution of the porosity by the use of better spheroidized granules, after the crushing finishing the first compression.

The invention can be used for the most varied purposes, whenever an open porosity is required, especially with a view to obtaining a lower thermal gradient in the mass of nuclear fuels of ceramic oxide.

Moreover, the compacts according to the invention can advantageously be impregnated by a conductive metal such as Ag, Cu, Fe, Ni, it being understood that the impregnation could take place with the aid of other materials, especially pyrocarbon.

This impregnation, especially by a metal, can be advantageously achieved by dipping in the melted metal, or by decomposition of organometallic compounds or of metal carbonyls.

As a result, whatever embodiment is adopted, ceramics can be prepared having numerous advantages with respect to ceramics already obtained by conventional processes, in particular:

the advantage of permitting an open porosity to be obtained within wide limits, and the advantage of permitting the obtainment of composite ceramic-metal ("cermet") bodies by a very simple process of impregnation.

Although the present invention has been described with specific reference to particular embodiments and examples, the invention should not be limited thereto, as various modifications are possible without departing from the scope or spirit of the invention.

What we claim is:

1. A process of preparing ceramics of fissionable uranium dioxide, which process comprises:
    subjecting a starting powder of said material to a first compression at a pressure P in the range 5 to 9 metric tons/square centimeter to obtain granules of a desired size,
    crushing and sifted these granules,
    subjecting the crushed and sifted material to a second compression at a pressure $p$ lower than P and in the range 2 to 5 metric tons/square centimeter,
    and then sintering said material to obtain a porous ceramic having open porosity.

2. A process according to claim 1 wherein, for the first compression, the starting powder has a specific surface area comprised between 3 and 15 square meters/gram.

3. A process according to claim 1 wherein, for the second compression, granules are prepared from the blocks initially comprised, the size of these granules being of the order of 50 to 400 microns.

4. A process according to claim 3 wherein the size of said granules is of the order of 160 to 250 microns.

5. A process according to claim 4 wherein said granules are subjected to spheroidization.

6. A process according to claim 1 wherein the difference $P-p$ is greater than 1 metric ton/square centimeter.

7. A process according to claim 1 wherein the difference $P-p$ decreases as the specific area increases.

8. A process according to claim 1 wherein the percentage of the final open porosity varies between 5 and 20%.

9. A process according to claim 8 wherein said percentage of final open porosity is of the order of 10 to 12%.

10. A process according to claim 9 wherein the final closed porosity is of the order of 2 to 3%.

11. A process according to claim 1 wherein said sintering is carried out between 1300° C. and 1700° C.

References Cited

UNITED STATES PATENTS

| | | | |
|---|---|---|---|
| 3,161,701 | 12/1964 | Johnson et al. | 264—.5 |
| 3,175,903 | 3/1965 | Herron | 75—213X |
| 3,236,921 | 2/1966 | Sermon | 264—.5 |
| 3,264,380 | 8/1966 | Parsons | 264—43 |
| 3,367,775 | 2/1968 | Allen | 75—213 |

CARL D. QUARFORTH, Primary Examiner

S. HELLMAN, Assistant Examiner

U.S. Cl. X.R.

75—213; 264—43